UNITED STATES PATENT OFFICE.

LEENDERT LAMBERTUS DAVID ZUIDERHOEK, OF AMSTERDAM, NETHERLANDS.

PROCESS FOR THE MANUFACTURE OF COKE BRIQUETS.

No. 824,680.　　　Specification of Letters Patent.　　Patented June 26, 1906.

Application filed September 6, 1904. Serial No. 223,493.

*To all whom it may concern:*

Be it known that I, LEENDERT LAMBERTUS DAVID ZUIDERHOEK, a subject of the Queen of the Netherlands, residing at 464 Heerengracht, Amsterdam, in the Kingdom of the Netherlands, have invented a certain new and useful Improved Process for the Manufacture of Coke Briquets, of which the following is a specification.

This invention relates to an improved process for the manufacture of briquets from coke and small coke, and has for its object to convert this kind of fuel into a more suitable form for burning purposes.

It has not been possible hitherto to combine small coke with an agglomerant or binding medium in such a manner as to impart to the small coke a satisfactory form for burning purposes. For this reason small coke has constituted hitherto in gas-works and the like a by-product of little value, which, furthermore, becomes in time a source of great inconvenience in such places.

The improved process of this invention has now for object to convert such small coke into a valuable fuel by pressing it according to requirement into the form of briquets or blocks which shall have the same fuel value as ordinary large-sized coke.

The improved process is as follows: The coke and the small coke are reduced by grinding or sifting to a powder of the desired certain degree of fineness. To this coke-powder there are added lime and cement, preferably Portland cement, in the proportions of three to ten parts of lime and one to three parts of Portland cement to one hundred parts of coke-powder, the materials being intimately mixed together. Then ten to twenty parts of water (preferably in the form of steam or spray) is added to the mixture, and the whole is stirred thoroughly together. The water causes the cement and the lime to set, whereby the coke-powder is bound together. The mass is then formed by pressing in suitable molds into hard briquets or blocks. The blocks produced in this manner are then dried and are then ready for use. The addition of the lime has furthermore for its object to prevent a too rapid combustion of the briquets. The amounts of the cement and lime, as also the pressure which is to be employed in pressing the blocks, depend on the purpose of use and on the requirements which are demanded of the coke blocks as a fuel.

The product resulting from this process consists in a fuel mass comprising a mixture of coke in a comminuted form with slaked lime and cement, preferably Portland cement, in substantially the proportions above given.

What I claim is—

The process, which consists in adding six parts of lime and two parts of Portland cement to one hundred parts of comminuted coke, then adding fifteen parts of water, mixing the mass intimately, allowing to set, and finally forming by pressure into briquets.

In testimony whereof I have hereunto set my hand in presence of two subscribing witnesses.

LEENDERT LAMBERTUS DAVID ZUIDERHOEK.

Witnesses:
　THOMAS HERMANUS VERHAVE,
　AUGUST SIEGFRIED DOCEN.